(12) United States Patent
Wollenweber

(10) Patent No.: US 6,971,240 B2
(45) Date of Patent: Dec. 6, 2005

(54) METHODS AND APPARATUS FOR EXHAUSTING GASES FROM GAS TURBINE ENGINES

(75) Inventor: Gary C. Wollenweber, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 10/812,706

(22) Filed: Mar. 30, 2004

(65) Prior Publication Data

US 2005/0217239 A1    Oct. 6, 2005

(51) Int. Cl.⁷ ................................................ F02C 7/20
(52) U.S. Cl. ..................... 60/772; 60/39.5; 60/797; 60/264; 239/265.19
(58) Field of Search .................... 60/772, 39.5, 796, 60/797, 264; 239/265.19; 244/54, 55

(56) References Cited

U.S. PATENT DOCUMENTS

| | | | |
|---|---|---|---|
| 3,565,208 A | * | 2/1971 | Millman et al. ............ 181/216 |
| 4,312,480 A | | 1/1982 | Miller |
| 4,585,189 A | * | 4/1986 | Buxton .......................... 244/54 |
| 4,825,648 A | * | 5/1989 | Adamson ................... 60/226.1 |
| 5,136,839 A | * | 8/1992 | Armstrong ................. 60/226.1 |
| 5,699,965 A | * | 12/1997 | Amelio ..................... 239/127.3 |
| 5,862,032 A | | 1/1999 | Cann |
| 6,016,651 A | | 1/2000 | Hammond et al. |
| 6,134,879 A | | 10/2000 | Frawley et al. |

* cited by examiner

*Primary Examiner*—Ehud Gartenberg
(74) *Attorney, Agent, or Firm*—Armstrong Teasdale LLP; William Scott Andes

(57) ABSTRACT

A method facilitates assembling a gas turbine engine. The method comprises mounting a core engine to a vehicle, coupling a fuselage radially outward and around the core engine, and coupling an exhaust nozzle to the core engine to channel exhaust gases discharged from the core engine. In addition, the method also comprises coupling an infrared suppression system in flow communication with the engine exhaust nozzle for channeling exhaust gases discharged from said exhaust nozzle to facilitate suppressing an exhaust infrared signature of the core engine during operation, wherein the infrared suppression system includes an access door and a flow channel that is coupled to the access door such that the flow channel is movable with the access door from a closed position to an open position.

20 Claims, 4 Drawing Sheets

METHODS AND APPARATUS FOR EXHAUSTING GASES FROM GAS TURBINE ENGINES

BACKGROUND OF THE INVENTION

This invention relates generally to gas turbine engines, and more specifically to methods and apparatus for exhausting gases from gas turbine engines.

The exhaust nozzle and plume from gas turbine engines is a potential source of high infrared energy which may be used for targeting and/or tracking purposes. More specifically, the infrared energy may be used for targeting and/or tracking by heat seeking missiles and/or various forms of infrared imaging systems. Because the military mission of helicopters may involve flying at low altitudes and at reduced speed in comparison to other military aircraft, helicopters are susceptible to ground-to-air, infrared-guided missiles. For example, within at least some known helicopters, the exposed metal surfaces of the gas turbine engine exhaust may operate in excess of 800° F., and thus emit infrared electromagnetic radiation at virtually all wavelengths as hot exhaust gases flow past the exposed surfaces. Moreover, continued heating of aircraft surfaces, including the fuselage, during hover or flight may also create structural issues.

Accordingly, within at least some known gas turbine engines, infrared signature reduction methods have been employed to facilitate reducing the infrared signature of a gas turbine engine. More specifically, at least some known gas turbine engines use complicated cooling schemes to supply cooling air to facilitate cooling directly visible surfaces and to dilute the high temperature exhaust gases. Other known gas turbine engines use infrared suppressors which change the direction of the exhaust flow discharged from the engine to facilitate hiding the hottest exposed surfaces with cooler surfaces.

However, generally, any benefits gained by such systems may be offset by losses created in acquiring the reduced infrared signature. More specifically, when the exhaust gases are cooled by cooling air, the air may be provided at a substantial engine power loss or weight penalty. Furthermore, in other known systems, the benefits gained by such systems may be offset by comparatively large installation space requirements, complex ducting, and/or substantial weight penalties. Moreover, the weight and physical size of such suppression systems may limit access to the gas turbine engine for routine maintenance and inspections.

BRIEF SUMMARY OF THE INVENTION

In one aspect, a method for assembling a gas turbine engine is provided. The method comprises mounting a core engine to a vehicle, coupling a fuselage radially outward and around the core engine, and coupling an exhaust nozzle to the core engine to channel exhaust gases discharged from the core engine. In addition, the method also comprises coupling an infrared suppression system in flow communication with the engine exhaust nozzle for channeling exhaust gases discharged from said exhaust nozzle to facilitate suppressing an exhaust infrared signature of the core engine during operation, wherein the infrared suppression system includes an access door and a flow channel that is coupled to the access door such that the flow channel is movable with the access door from a closed position to an open position.

In another aspect, an exhaust assembly for a gas turbine engine including a turbine rear frame is provided. The exhaust assembly includes an engine exhaust nozzle extending downstream from the turbine rear frame, and an infrared suppression system coupled in flow communication with the engine exhaust nozzle for channeling exhaust gases discharged from the exhaust nozzle. The suppression system includes a flow channel coupled to an access door, such that the flow channel is movable with the access door from a closed position to an open position wherein the access door forms a work platform configured to support a user thereon. The suppression system facilitates suppressing an exhaust infrared signature of the gas turbine engine.

In a further aspect, a gas turbine engine configured to couple to a fuselage is provided. The gas turbine engine includes a core engine and an exhaust assembly that extends downstream from the core engine for discharging exhaust gases from the core engine. The exhaust assembly includes an exhaust nozzle that is coupled to the core engine and an infrared suppression system that is coupled in flow communication downstream from the engine exhaust nozzle for channeling exhaust gases discharged from the exhaust nozzle. The infrared suppression system includes a flow channel and an access door. The flow channel is coupled to the access door, such that the flow channel is movable with the access door from a closed position to an open position. Both the flow channel and access door are coupled to the fuselage.

DETAILED DESCRIPTION OF THE INVENTION

Figure 1:
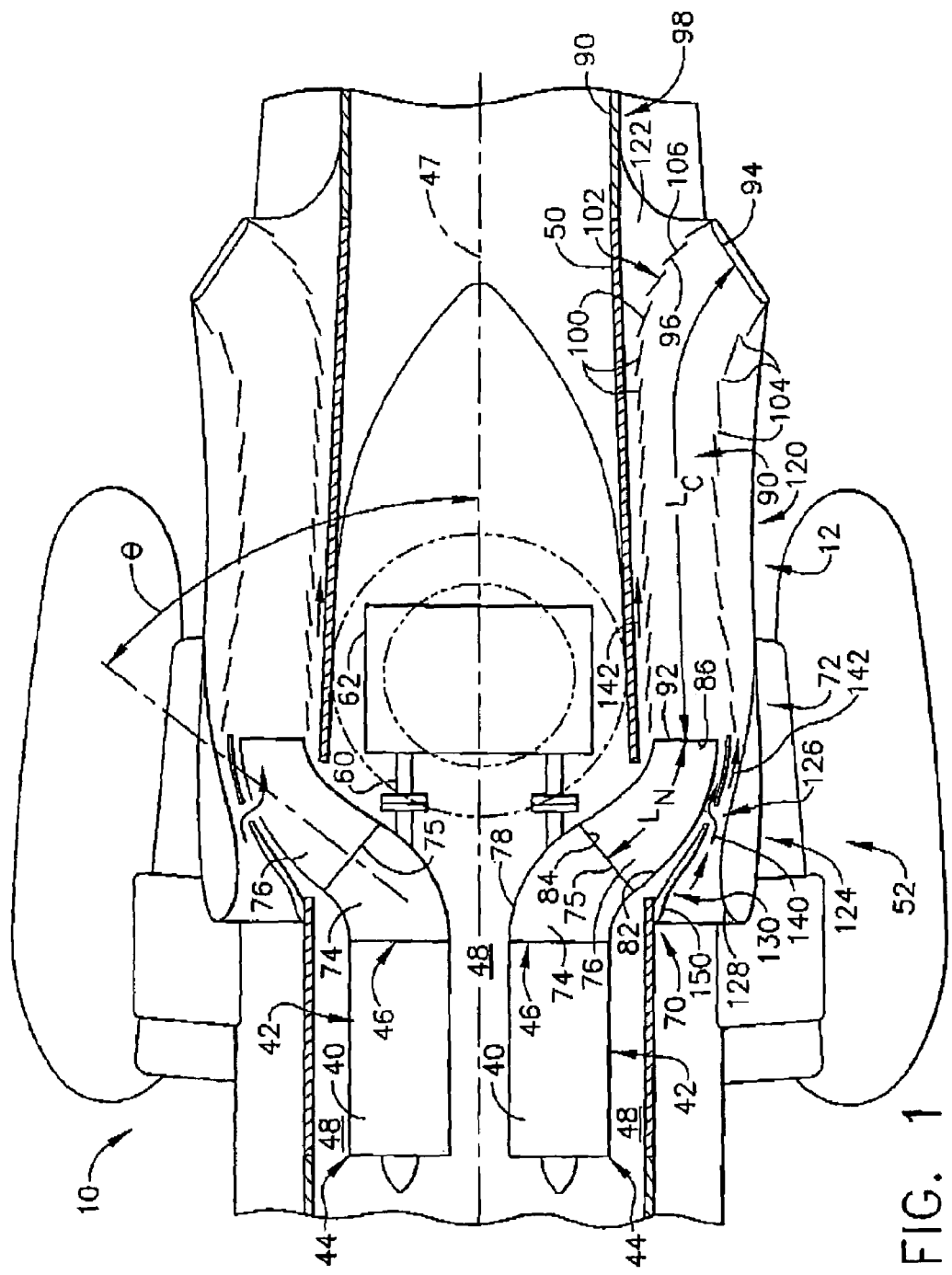
FIG. 1 is a plan view of a gas turbine engine assembly including an access door that may be used with a helicopter.
Figure 2:
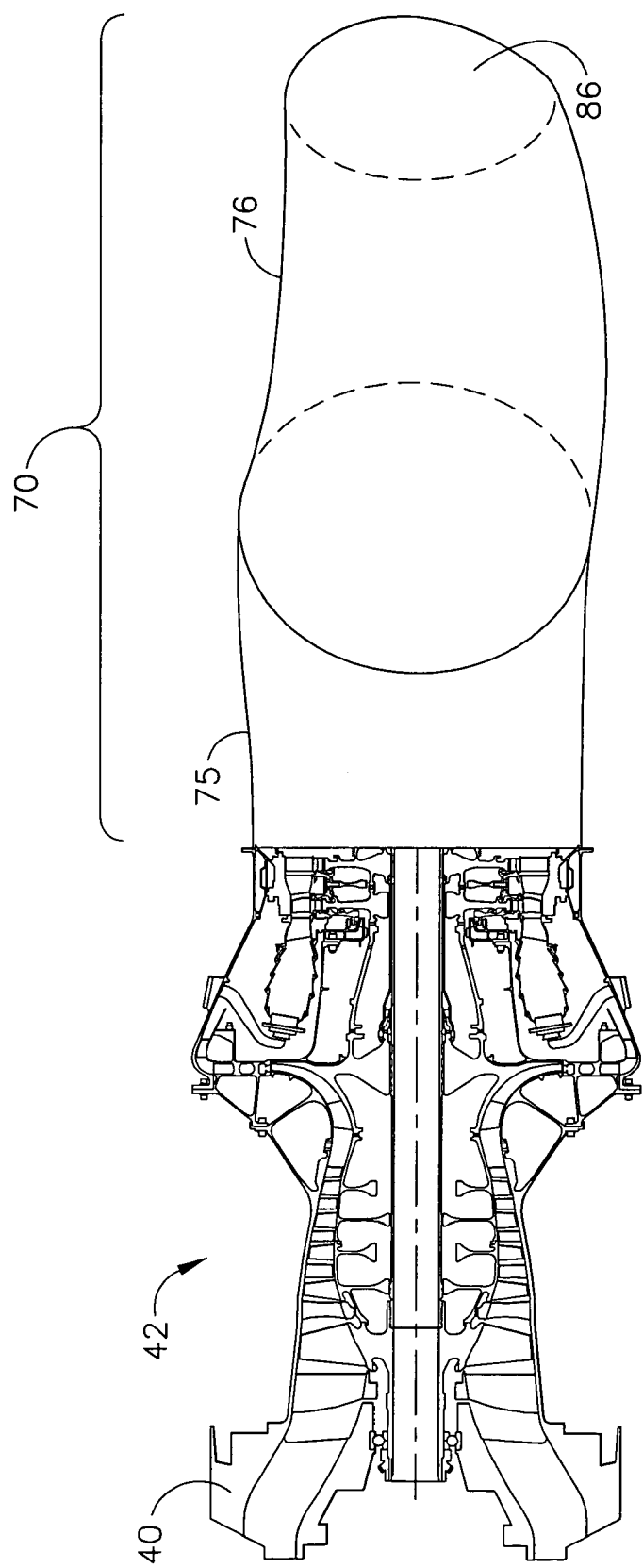
FIG. 2 is a perspective view of a core engine and an exemplary exhaust nozzle that may be used with the gas turbine engine assembly shown in FIG. 1.
Figure 3:
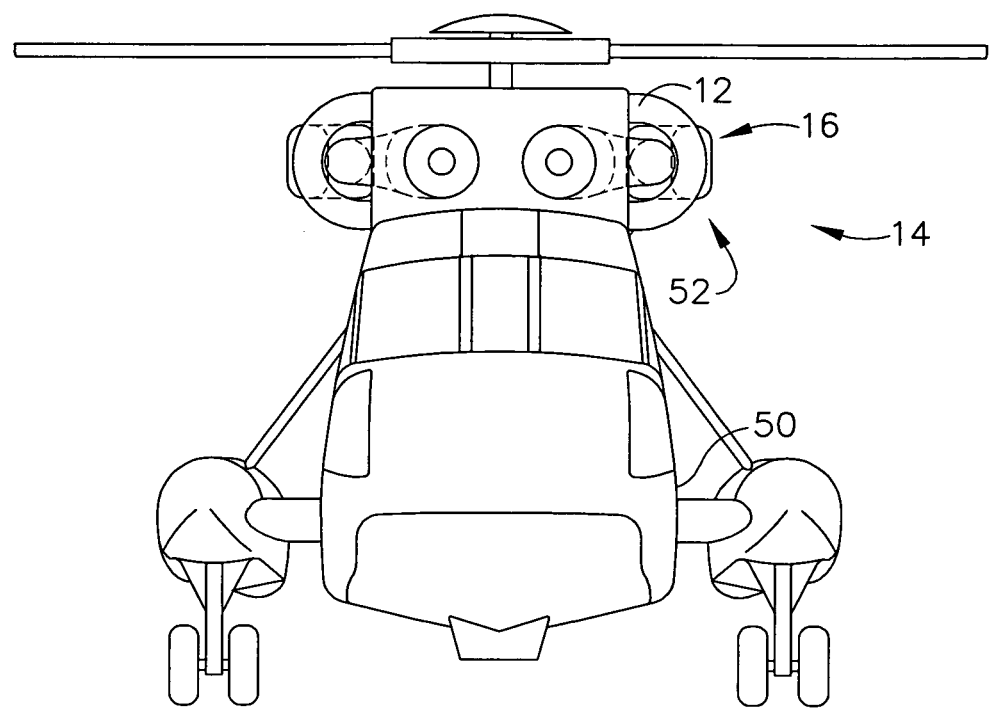
FIG. 3 is a partial front view of an exemplary helicopter including the access door shown in FIG. 1 in a closed position.
Figure 4:
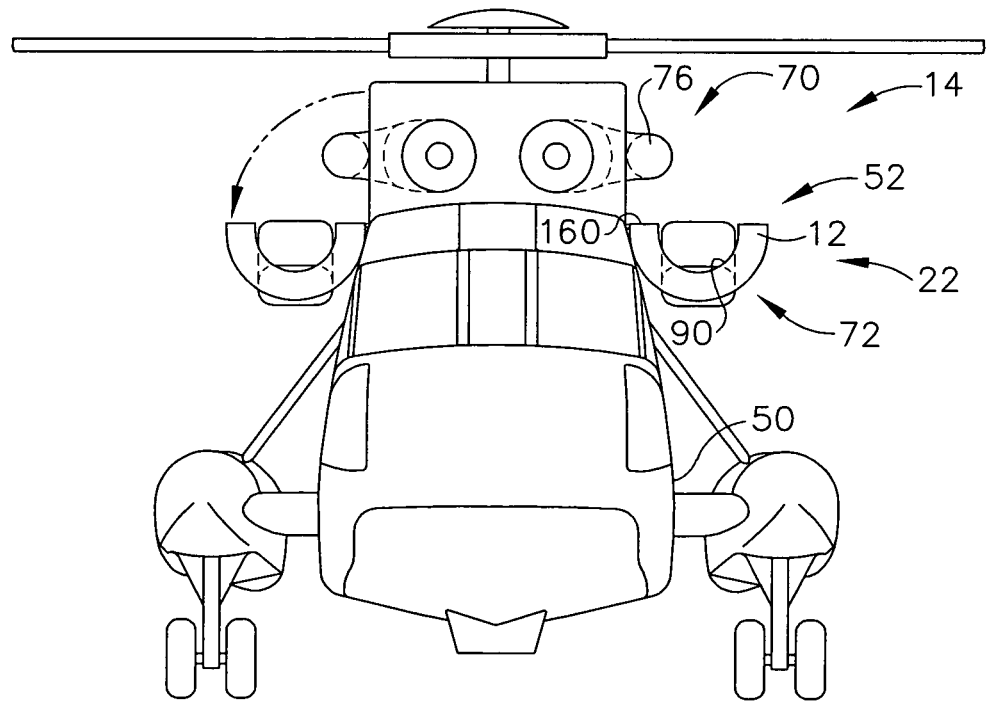
FIG. 4 is a partial front view of the helicopter shown in FIG. 3 including the access door shown in FIG. 1 in an open position.
Figure 5:
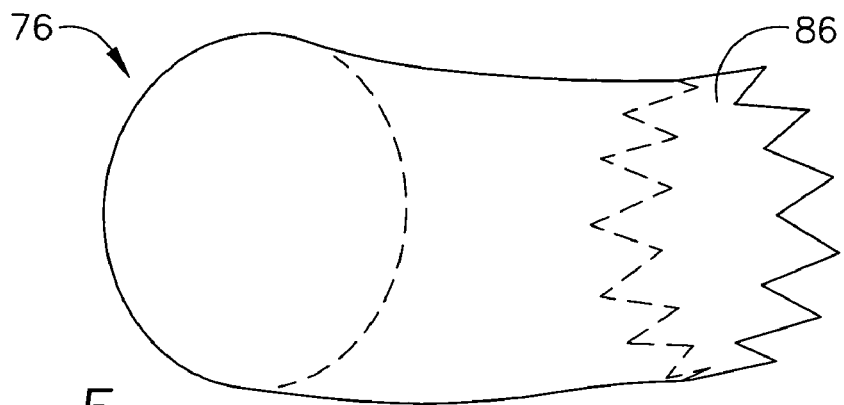
FIG. 5 is an alternative embodiment of a turbine exhaust nozzle that may be used with the gas turbine engine assembly shown in FIG. 1.
Figure 6:
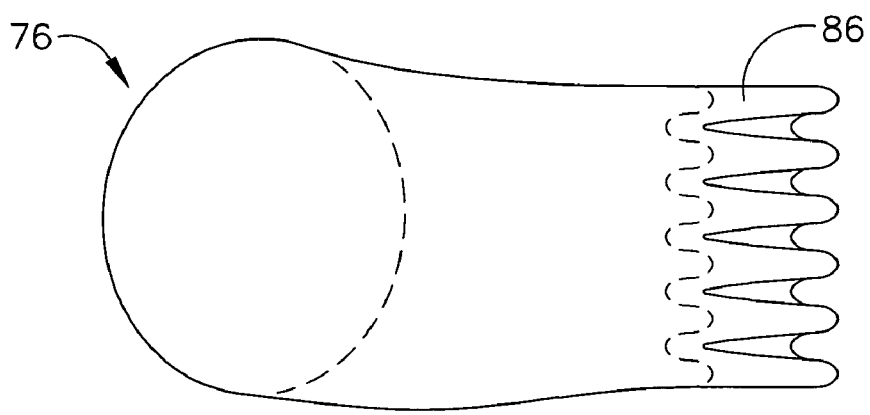
FIG. 6 is another alternative embodiment of an exemplary turbine exhaust nozzle that may be used with the gas turbine engine assembly shown in FIG. 1.
Figure 7:
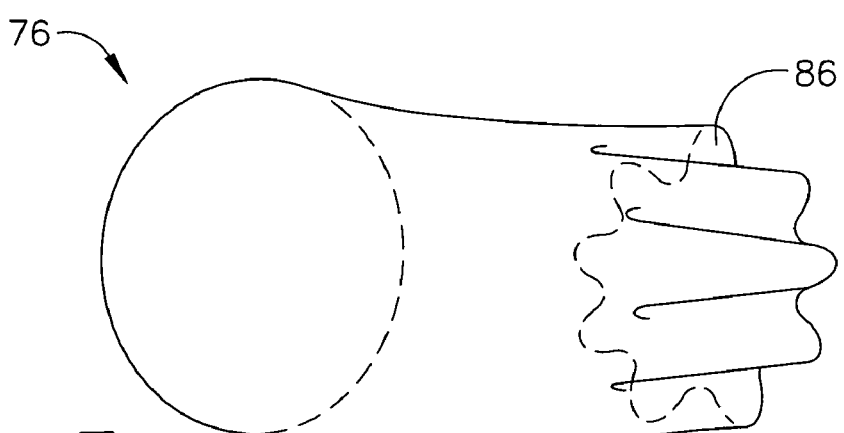
FIG. 7 is a further alternative embodiment of an exemplary turbine exhaust nozzle that may be used with the gas turbine engine assembly shown in FIG. 1.

FIG. 1 is a plan view of a helicopter 10 that includes two gas turbine engine assemblies 42 and access doors 12. FIG. 2 is a perspective view of a core engine 40 and exhaust nozzle 76 that may be used with gas turbine engine assembly 42. FIG. 3 is a partial front view of an exemplary helicopter 14 including access door 12 shown in a closed position 16. FIG. 4 is a partial front view of helicopter 14 including access door 12 shown in an open position 22. FIGS. 5, 6, and 7 are alternative embodiments of turbine exhaust nozzles 76 that may be used with gas turbine engine assembly 42.

In the exemplary embodiment, helicopter 14 includes a pair of gas turbine engines 40 that each include an inlet end 44 and an exhaust end 46. Engines 40 are symmetrical with respect to an axis of symmetry 47 extending between engines 40. Core engines 40 are mounted within an engine compartment 48 defined by a helicopter fuselage 50. Specifically, in the exemplary embodiment, gas turbine engine assembly 42 includes core engines 40 and an exhaust assembly 52 that extends downstream from engines 40 for discharging exhaust gases from engines 40. In one embodiment, each core engine 40 is a T58 engine commercially available from General Electric Aircraft Engines, Lynn, Mass. A rear drive shaft 60 extends from engine 40 to a main transmission 62.

Exhaust assembly 52 includes a pair of exhaust nozzle assemblies 70 and suppression system 72. Suppression system 72, as described in more detail below, facilitates suppressing an exhaust infrared signature of gas turbine engine assembly 42 during engine operation. As used herein, the term suppression mean that the infrared signature emanating from gas turbine engine assembly 42 is facilitated to be reduced below a predetermined threshold value which is indicative of the acquisition, tracking, and/or targeting capability of a particular infrared threat.

Each exhaust nozzle assembly 70 includes a turbine rear frame housing 75 that includes a drive shaft tunnel 74, and a primary nozzle 76. Specifically, exhaust discharged from each engine 40 is initially channeled through rear frame housing 75 and around drive shaft tunnel 74 prior to entering primary nozzle 76. In the exemplary embodiment, each drive shaft tunnel 74 is integrally formed with an elbow 78 such that exhaust entering each rear frame 75 is discharged outwardly at an oblique angle $\theta$ measured with respect to axis of symmetry 47. More specifically, in the exemplary embodiment, angle $\theta$ is approximately sixty degrees.

Exhaust discharged from engines 40 is channeled into a pair of primary nozzles 76 that are each coupled to turbine rear frame housing 75. In the exemplary embodiment, each primary nozzle is a single-wall nozzle that includes an elbow 82. Elbow 82 causes the direction of exhaust flowing through nozzle 76 to be discharged in a direction that is substantially parallel to centerline axis of symmetry 47. Accordingly, a length $L_N$ of primary nozzle 76, measured between an inlet end 84 and a discharge end 86 that is downstream from inlet end 84, is variably selected to enable flow to be discharged substantially axially therefrom. Moreover, nozzle length $L_N$ ensures that an exit aperture defined at nozzle discharge end 86 is oriented substantially perpendicularly to a direction of exhaust flow discharged therethrough. In addition, the combination of elbow 82 and nozzle length $L_N$ causes nozzle 76 to extend through fuselage 50 such that exhaust discharged from nozzle 76 is accelerated and then discharged adjacent an external surface 98 of fuselage 50. In an alternative embodiment, depending on the application of gas turbine engine assembly 10, flow through rear frame 75 and primary nozzles 76 remains substantially axial, as neither rear frame 75 and/or primary nozzles 76 include respective elbows 78 and 82.

A cross-sectional area defined of the nozzle exit aperture defined at discharge end 86 may be any cross-sectional shape that enables nozzle 76 to function as describe herein. More specifically, the nozzle exit aperture facilitates inducing mixing of exhaust flow discharged therefrom, without promoting an outward propagation of exhaust gases discharged therefrom. For example, as shown in FIGS. 5 and 6, the nozzle exit aperture cross-sectional area may be, but is not limited to being, circular, elliptical, rectangular, or daisy-shaped. Additionally, discharge end 86 may also include other mixing enhancement features such as, but not limited to, lobes, scalloped edges, turbulators, and/or chevrons. Moreover, in another alternative embodiment, discharge end 86 includes a convergent lobe design which facilitates mixing exhaust gases discharged therethrough with ambient cooling air introduced to gas turbine engine assembly 10, as described in more detail below.

Exhaust exiting primary nozzles 76 is channeled into suppression system 72. Suppression system 72 includes a pair of flow channels 90 that are each coupled to an access door 12. More specifically, in the exemplary embodiment, flow channel 90 is formed integrally with door 12. Each flow channel 90 is coupled in flow communication with primary nozzles 76 such that flow exiting nozzles 76 is routed through flow channels 90 before being discharged to the atmosphere. More specifically, a cross-sectional area of each flow channel is selected to form an annulus with each respective primary nozzle 76, such that flow exiting nozzles 76 forms a venturi effect which creates a local low pressure immediately downstream from each nozzle discharge end 86. Accordingly, in one embodiment, each flow channel 90 is tapered from an inlet end 92 coupled to primary nozzle 76, through an exit aperture or discharge end 94. More specifically, in the exemplary embodiment, flow channel 90 is tapered such that a cross-sectional area defined within flow channel 90 by an inner surface 96 of flow channel 90 is progressively decreased from inlet end 92 to discharge end 94. Accordingly, the tapering facilitates ensuring a constant exhaust flow path velocity is maintained within flow channel 90.

The cross-sectional area defined within flow channel 90 may be any cross-sectional shape that enables flow channel 90 to function as described herein, such as, but not limited to substantially circular, elliptical, or square. In addition, in the exemplary embodiment, discharge end 94 is formed with a substantially rectangular cross-sectional profile, and as such, in the exemplary embodiment, the cross-sectional shape of flow channel 90 varies along a length $L_C$ of flow channel 90 to facilitate providing a smooth transition from inlet end 12 to discharge end 94. Moreover, the variable cross-sectional area of flow channel 90 also facilitates optimizing engine backpressure within gas turbine engine assembly 42, while providing a reduced cooling slot exit static pressure to facilitate achieving a desired cooling flow, as described in more detail below. Accordingly, by optimizing system backpressure, flow channel 90 also facilitates maintaining a desired engine operating efficiency.

Each flow channel $L_C$ is measured between inlet and exit ends 12 and 94, respectively. Channel length $L_C$ ensures that exhaust discharged from core engines 40 is discharged downstream from, and does not impinge upon, transmission 62. Channel length $L_C$ also facilitates mixing between exhaust discharged from core engine 40 and ambient cooling air introduced to each flow channel 90, as described in more detail below, to facilitate reducing an operating temperature of exhaust flowing therethrough. The exact channel length $L_c$ is a function of a plurality of parameters, including, but not limited to, the particular installation, available power penalty, and desired infrared and radar cross-sectional reduction goals.

In the exemplary embodiment, each flow channel 90 also includes a plurality of cooling baffles 100, cooling slots 104, and an aft elbow 102. Elbow 102 changes a direction of exhaust flowing through flow channel 90, such that exhaust entering each flow channel 90 is discharged outwardly with respect to axis of symmetry 47 to facilitate preventing the exhaust gases from impinging against, or contacting, fuselage 50. Cooling slots 104 extend between flow channel inner surface 96 and an outer surface 106 of flow channel 90 to facilitate admitting cooling air into a flow channel 90.

Slots 104 are aft facing such that exhaust gases entering flow channel 90 are prevented from exiting flow channel 90 through slots 104. More specifically, air entering slots 104 forms a cooling boundary layer to facilitate cooling those portions of flow channel inner surface 96 that are directly visible through flow channel exit aperture 94. Accordingly, the combination of exit aperture 94, flow channel length $L_C$, and elbow 102 facilitate obstructing or preventing direct line-of-sight viewing of uncooled portions of flow channel inner surface 96 through exit aperture 94. In addition, in the exemplary embodiment, at least a portion of flow channel inner surface 96 is coated with a high emissivity coating to substantially prevent infrared reflections through exit aperture 94 that may be emitted or originate from hotter "hidden" surfaces. In an alternative embodiment, channel inner surface 96 includes a surface characteristic that substantially prevents infrared reflections through exit aperture 94 that may be emitted or originate from hotter "hidden" surfaces.

Primary nozzles 76 and flow channels 90 are surrounded by an insulated cowl 120 such that nozzles 76 and flow channels 90 are externally obstructed from direct view. More specifically, cowl 120 is coupled around primary nozzles 76 and flow channels 90 such that at least one cooling passage 126 is defined between an inner surface 128 of cowl 120 and nozzles and flow channels 76 and 90, respectively. More specifically, cooling passage 126 is coupled in flow communication with flow channel slots 104, Moreover, cowl 120 facilitates preventing hot surfaces extending over nozzles 76 and flow channels 90 from emitting infrared signals radially outwardly. Cowl 120 includes a fairing or boat tail portion 122 and an inlet mixing portion 124. Boat tail portion 122 extends between fuselage 50 and flow channel elbow 102 to provide structural support to flow channel 90. In the exemplary embodiment, boat tail portion 122 is tapered to a thin trailing edge 126 to facilitate reducing drag during flight operations.

Cowl mixing portion 124 includes a plurality openings 130 that are defined along an upstream side 132 of cowl 120. In an alternative embodiment, cowl mixing portion 124 includes only one opening 130. Specifically, openings 130 are generally forward facing to prevent exhaust gases from being discharged therethrough, and such that openings 130 function as a ram air scoop to enable ambient air to be admitted via a ram effect, or through natural flow, into primary nozzles 76 and flow channels 90.

Ambient air channeled through openings 130 facilitates annulus mixing and flow channel cooling. More specifically, a portion 140 of ambient air entering openings 130, is channeled into an annulus surrounding primary nozzles 76, and the remaining portion 142 of ambient air entering openings 130, is channeled into cooling passage 126 and channeled to cooling slots 104. Air 140 is directed into the annulus surrounding primary nozzles 76 to facilitate mixing with exhaust gases discharged from primary nozzles 76.

An insulated blocking panel 150 extends from fuselage 50 towards cowl inner surface 128 adjacent openings 30 to facilitate preventing a direct line-of-sight viewing of primary nozzles 76 or flow channels 90 through openings 130. Moreover, in the exemplary embodiment, cowl inner surface 128 is coated with a high emissivity coating to substantially prevent infrared reflections through exit aperture that may be emitted or originate from higher temperature surfaces. In an alternative embodiment, cowl inner surface 128 includes a surface characteristic that substantially prevents infrared reflections through openings 130 that may be emitted or originate from higher temperature surfaces.

Flow channels 90 are each coupled to access door 12, and as such, are moveable with access door 12 between open position 22 and closed position 16. More specifically, when access door 12 is in closed position 16, flow channel 90 is coupled in position to capture exhaust flow discharged from primary nozzles 76, as described above. However, during helicopter non-flight operations, because access door 12 is hingedly coupled to fuselage 50, access door 12 may be rotated from closed position 16 to open position 22 to provide access to components within gas turbine engine assembly 10. Moreover, as door 12 is rotated to open position 22 from closed position 16, flow channel 90 and cowl 120 are each moved with door 12, while primary nozzle 76 remains coupled in position to engine rear housing 75. Accordingly, primary nozzle 76, flow channel 90, blocking panel 150, and cowl 120 are designed for clearance to enable door 12 to be opened, yet retain suppressor flow functionality when door 12 is closed.

In an alternative embodiment, flow channel 90 includes a plurality of hollow baffles which are internally cooled. The baffles are positioned across the flowpath defined within flow channel 90 such that the baffles actually define a plurality of flowpath passages through flow channel 90. During operation, because the baffles are internally cooled, exhaust flowing past the baffles is convectively cooled.

In the exemplary embodiment, access door 12 is substantially rectangular, and includes a substantially planar inner surface 160. Accordingly, when rotated to open position 22, planar surface 160 extends substantially perpendicularly from fuselage 50 and is substantially parallel to the ground beneath helicopter 14. Moreover, when access door 12 is in open position 22, access door 12 is fabricated with enough strength to support a user on inner surface 160, and as such, may be used as a work platform.

During operation, cooling air is supplied to gas turbine engine assembly 42 through cowl openings 130. A portion 140 of such ambient air is channeled into the annulus surrounding primary nozzles 76 to facilitate reducing an operating temperature of external surfaces of primary nozzles 76. More specifically, the low pressure area created by the venturi effect created as exhaust flow exits primary nozzles 76 facilitates drawing additional ambient air 140 into the channel extending downstream from primary nozzles 76. The nozzle exit aperture defined at discharge end 86 facilitates inducing mixing of ambient cooling air 140 and exhaust gases discharged from core engine 40 such that hot exhaust gases at primary nozzle discharge end 86 are facilitated to be suppressed. In addition, the mixing enhancement features included at nozzle discharge end 86 facilitate enhancing shearing and mixing between exhaust and ambient air flows.

In addition, a portion 142 of such ambient air is channeled through passage 126 and to slots 104, during operation, wherein remaining air 142 entering flow channel 90 provides a layer of cooling air to facilitate cooling aft portions of flow channel inner surface 96 that are visible through exit aperture 94. Accordingly, slots 104 facilitate reducing an operating temperature of exhaust flow path surfaces. Additional suppression is achieved through the combination of exit aperture 94, flow channel length $L_C$, and elbow 102, which facilitate obstructing or preventing direct line-of-sight viewing of uncooled portions of flow channel inner surface 96 through exit aperture 94. Accordingly, suppression system 72 facilitates the operating temperature of engine exhaust through gas turbine engine assembly 10, thus suppressing the infrared signature generated by core engines 40.

In the exemplary embodiment, flow exit aperture 86 of primary nozzle 76 has either a substantially circular cross-sectional profile or a substantially elliptical cross-sectional profile. Alternatively, exit aperture 86 may have any cross-sectional profile that enables primary nozzle 76 to function as described herein.

Moreover, there are several mixing enhancement features included in this invention to facilitate enhancing shearing and mixing between primary nozzle exhaust and ambient air flows 140. For example and referring to FIG. 5, nozzle exit aperture 86 facilitates enhances mixing of ambient cooling air 140 and exhaust gases discharged from core engine 40 using chevron-shaped extensions of primary nozzle 76. In this embodiment, each chevron-shaped extension is cup- or spoon-shaped and includes a concave surface that faces inwardly towards the hot primary nozzle exhaust flow.

Referring to FIG. 6, nozzle exit aperture 86 is substantially rectangular in cross-section and facilitates enhances mixing of ambient cooling air 140 and exhaust gases discharged from core engine 40 via corrugated surfaces of primary nozzle 76. In this embodiment, each corrugation is aligned such that the axis of corrugation extends substantially in the same direction as that of the hot primary nozzle exhaust flow. However, the enhanced mixing may be accomplished with or with out the use of corrugations and regardless of the cross-sectional shape of nozzle 76 adjacent aperture 86. For example, in the exemplary embodiment illustrated in FIG. 7, nozzle 76 has a substantially circular cross sectional profile adjacent exit aperture 86 and includes a plurality of corrugations.

The above-described gas turbine engine assemblies are cost-effective and highly reliable. Each assembly includes a exhaust assembly that facilitates suppressing an infrared signature generated by the core engines. Moreover, in the exemplary embodiment, the exhaust assembly initially turns and accelerates the exhaust prior to mixing the exhaust with an ambient airflow. Additional cooling air facilitates cooling flowpath surfaces that are visible through the exhaust assembly discharge. As a result, the exhaust assembly system facilitates suppressing an infrared signature of the engine in a cost-effective and reliable manner.

Exemplary embodiments of gas turbine assemblies are described above in detail. The assemblies are not limited to the specific embodiments described herein, but rather, components of each assembly may be utilized independently and separately from other components described herein. Each gas turbine engine assembly component can also be used in combination with other gas turbine engine assembly components.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   mounting a core engine to a vehicle;
   coupling a fuselage radially outward and around the core engine;
   coupling an exhaust nozzle to the core engine to channel exhaust gases discharged from the core engine; and
   coupling an infrared suppression system in flow communication with the engine exhaust nozzle for channeling exhaust gases discharged from said exhaust nozzle to facilitate suppressing an exhaust infrared signature of the core engine during operation, and wherein the infrared suppression system includes an access door and a flow channel having a closed contour in cross-section that is coupled to the access door such that the flow channel is movable with the access door from a closed position to an open position.

2. A method in accordance with claim 1 wherein coupling an infrared suppression system in flow communication with the engine exhaust nozzle further comprises coupling an inlet aperture of the engine exhaust nozzle to a discharge end of the core engine such that a discharge aperture of the engine exhaust nozzle is aligned substantially perpendicular to a direction of exhaust gases flowing through the exhaust nozzle.

3. A method in accordance with claim 2 further comprising coupling a cowl to the access door such that said cowl is movable with the access door between the closed and open positions, and wherein the cowl includes an internal surface, an external surface, and at least one opening extending therebetween that is coupled in flow communication with the nozzle discharge aperture.

4. A method in accordance with claim 3 wherein coupling a cowl to the access door further comprises coupling the cowl to the access door such that at least one cooling passage is defined between the flow channel and the cowl.

5. A method in accordance with claim 3 wherein coupling an infrared suppression system in flow communication with the engine exhaust nozzle further comprises forming at least one opening extending between an inner and outer surface of the cowl such that during operation, ambient air is channeled through the at least one cowl opening to facilitate reducing an operating temperature of said flow channel.

6. An exhaust assembly for a gas turbine engine including a turbine rear frame, said exhaust assembly comprising:
   an engine exhaust nozzle extending downstream from the turbine rear frame; and
   an infrared suppression system coupled in flow communication with said engine exhaust nozzle for channeling exhaust gases discharged from said exhaust nozzle, said suppression system comprising a flow channel having a closed contour in cross-section coupled to an access door, such that said flow channel is movable with said access door from a closed position to an open position wherein said access door forms a work platform, said suppression system facilitates suppressing an exhaust infrared signature of the gas turbine engine.

7. An exhaust assembly in accordance with claim 6 wherein said engine exhaust nozzle comprises an inlet aperture and a discharge aperture, said discharge aperture is substantially perpendicular with respect to a direction of exhaust gases flowing therethrough.

8. An exhaust assembly in accordance with claim 7 further comprising a cowl coupled to said access door such that said cowl is movable with said access door between said access door closed and open positions, said cowl comprises an internal surface, an external surface, and at least one opening extending therebetween, said at least one opening coupled in flow communication with said nozzle discharge aperture.

9. An exhaust assembly in accordance with claim 8 wherein at least a portion of said cowl internal surface is spaced radially from said flow channel such that at least one cooling passage is defined between said flow channel and said cowl, said at least one cooling passage is coupled in flow communication with said cowl at least one opening.

10. An exhaust assembly in accordance with claim 7 wherein said engine exhaust nozzle discharge aperture is configured to inducing mixing of exhaust gases and ambient air to facilitate reducing an operating temperature of exhaust gases flowing through said exhaust assembly.

11. An exhaust assembly in accordance with claim 7 wherein said flow channel comprises an inner surface, an outer surface, and a plurality of openings extending therebetween, said openings for channeling ambient cooling air therein to facilitate reducing an operating temperature of said flow channel.

12. An exhaust assembly in accordance with claim 7 wherein the gas turbine engine has a centerline extending therethrough, said flow channel comprises an elbow for channeling exhaust gases discharged from said flow channel outward with respect to the engine centerline axis.

13. An exhaust assembly in accordance with claim 7 wherein at least a portion of said flow channel facilitates preventing infrared reflections.

14. A gas turbine engine configured to couple to a fuselage, said gas turbine engine comprising:
a core engine; and
an exhaust assembly extending downstream from said core engine for discharging exhaust gases from said core engine, said exhaust assembly comprising an exhaust nozzle coupled to said core engine and an infrared suppression system coupled in flow communication downstream from said engine exhaust nozzle for channeling exhaust gases discharged from said exhaust nozzle, said infrared suppression system comprising a flow channel having a closed contour in cross-section and an access door, said flow channel coupled to said access door, such that said flow channel is movable with said access door from a closed position to an open position.

15. A gas turbine engine in accordance with claim 14 wherein said core engine is mounted radially inward from the fuselage, said engine exhaust nozzle extends through the fuselage, and said flow channel is mounted to an external surface of the fuselage, such that exhaust gases discharged from said flow channel are discharged in a direction away from the fuselage.

16. A gas turbine engine in accordance with claim 15 wherein said engine exhaust nozzle comprises an inlet aperture and a discharge aperture, said discharge aperture is substantially perpendicular to a direction of exhaust gases flowing therethrough, and wherein, wherein said access door forms a work platform configured to support a user thereon when rotated to the open position.

17. A gas turbine engine in accordance with claim 16 further comprising a cowl coupled to said access door such that said cowl is movable with said access door between said closed and open positions, said cowl comprises an internal surface, an external surface, and at least one opening extending therebetween, said at least one opening coupled in flow communication with said exhaust nozzle discharge aperture.

18. A gas turbine engine in accordance with claim 16 further comprising a cowl coupled to said access door such that said cowl is movable with said access door between said closed and open positions, said cowl comprises an internal surface, an external surface, and at least one opening extending therebetween, at least a portion of said cowl internal surface is spaced radially from said flow channel such that at least one cooling passage is defined between said flow channel and said cowl, said at least one cooling passage is coupled in flow communication with said cowl at least one opening.

19. A gas turbine engine in accordance with claim 16 wherein said engine exhaust nozzle discharge aperture induces mixing between exhaust gases and ambient air to facilitate reducing an operating temperature of exhaust gases flowing through said exhaust assembly.

20. A gas turbine engine in accordance with claim 16 wherein said flow channel comprises an inner surface, an outer surface, and a plurality of openings extending therebetween, said openings for channeling ambient cooling air therein to facilitate reducing an operating temperature of said flow channel.

* * * * *